(12) United States Patent
Kim et al.

(10) Patent No.: US 8,883,331 B2
(45) Date of Patent: Nov. 11, 2014

(54) PROTECTIVE CIRCUIT MODULE AND RECHARGEABLE BATTERY INCLUDING THE SAME

(75) Inventors: Bongyoung Kim, Yongin-si (KR); Inkyu Park, Yongin-si (KR); Heongsin Kim, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1219 days.

(21) Appl. No.: 12/588,633

(22) Filed: Oct. 22, 2009

(65) Prior Publication Data

US 2010/0098974 A1 Apr. 22, 2010

(30) Foreign Application Priority Data

Oct. 22, 2008 (KR) .................. 10-2008-0103639

(51) Int. Cl.
- *H01M 14/00* (2006.01)
- *H01M 10/50* (2006.01)
- *H02H 5/04* (2006.01)
- *H01M 2/04* (2006.01)
- *H01M 10/42* (2006.01)
- *H01M 10/0525* (2010.01)

(52) U.S. Cl.
CPC ........ *H01M 2/0404* (2013.01); *H01M 10/0525* (2013.01); *H01M 2/0473* (2013.01); *Y02E 60/12* (2013.01); *H01M 2200/106* (2013.01); *H01M 10/425* (2013.01)
USPC .................... 429/7; 429/62; 361/103

(58) Field of Classification Search
CPC .. H01M 2200/106; H01M 2/34; H01M 2/348
See application file for complete search history.

(56) References Cited

U.S. PATENT DOCUMENTS

| 6,114,942 | A   | * | 9/2000  | Kitamoto et al. ........... 338/22 R |
|-----------|-----|---|---------|--------------------------------------|
| 6,593,844 | B1  |   | 7/2003  | Iwao et al.                          |
| 2004/0137314 | A1 | * | 7/2004  | Fukui ................................. 429/62 |
| 2006/0044728 | A1 |   | 3/2006  | Kim et al.                           |
| 2006/0251930 | A1 |   | 11/2006 | Kim                                  |
| 2008/0096101 | A1 | * | 4/2008  | Kwag et al. ................... 429/121 |
| 2008/0253050 | A1 |   | 10/2008 | Yu et al.                            |
| 2009/0122455 | A1 | * | 5/2009  | Jang et al. ..................... 361/106 |
| 2010/0086845 | A1 |   | 4/2010  | Jung et al.                          |

FOREIGN PATENT DOCUMENTS

| CN | 1331832   | A  | 1/2002 |
|----|-----------|----|--------|
| CN | 101170164 | A  | 4/2008 |
| EP | 1422771   | A1 | 5/2004 |
| EP | 1883125   | A1 | 1/2008 |

(Continued)

OTHER PUBLICATIONS

EP Office Action in EP 9705809EP-HH/SF, dated Jan. 21, 2011 (Kim, et al.).

(Continued)

*Primary Examiner* — Barbara Gilliam
*Assistant Examiner* — Stephan Essex
(74) *Attorney, Agent, or Firm* — Lee & Morse, P.C.

(57) ABSTRACT

A protective circuit module and a rechargeable battery including the same, the protective circuit module including a circuit board main body having an electrode terminal tab configured to electrically connect to an electrode terminal of a bare cell, a chip-type PTC device on the circuit board main body, and a heat transfer member connected to the chip-type PTC device and the electrode terminal tab.

17 Claims, 4 Drawing Sheets

(56) References Cited

FOREIGN PATENT DOCUMENTS

| | | |
|---|---|---|
| EP | 1919009 A2 | 5/2008 |
| EP | 2164121 A1 | 3/2010 |
| JP | 2002-076206 A | 3/2002 |
| JP | 2006-040893 A | 2/2006 |
| JP | 2006-313743 A | 11/2006 |
| JP | 2009-301960 A | 12/2009 |
| JP | 2010-003433 A | 1/2010 |
| JP | 2010-507895 A | 3/2010 |
| KR | 10 2003-0038560 A | 5/2003 |
| KR | 10-0760784 B1 | 9/2007 |
| KR | 10 2009-0047686 A | 5/2009 |
| WO | WO 2008/050956 A1 | 5/2008 |

OTHER PUBLICATIONS

Japanese Office Action in JP 2009-243296, dated Jul. 17, 2012 (Kim, et al.).

Chinese First Office Action in CN 200910207258.8, dated Feb. 22, 2012 (Kim, et al.).

\* cited by examiner

PROTECTIVE CIRCUIT MODULE AND RECHARGEABLE BATTERY INCLUDING THE SAME

BACKGROUND OF THE INVENTION

1. Field of the Invention

Embodiments relate to a protective circuit module and a rechargeable battery including the same.

2. Description of the Related Art

A rechargeable battery is a battery capable of repeated recharging and is recently attracting a great deal of attention for its wide applicability to a variety of electronic equipment due to convenient portability and rechargeability. A rechargeable battery, e.g., a square-type rechargeable battery, may be composed of a bare cell including a generally square can, an electrode assembly housed inside the can, and a cap assembly connected to an opening for inserting the electrode assembly into the can.

The bare cell may be electrically connected to a protective circuit board to control charge/discharge of the rechargeable battery. A safety device, e.g., a positive temperature coefficient (PTC) device, a thermal fuse, or the like, may be disposed between the bare cell and the protection circuit board.

The safety device may be connected to at least one electrode terminal of the bare cell and may be adjacent to the bare cell to thereby cut off the current flow from the bare cell to the outside when the battery temperature rises or a voltage of the battery rises above a given value due to excessive charge/discharge. That is, the safety device may serve to prevent damage or deterioration of the battery that may occur when the battery is exposed to high temperature and/or overvoltage conditions.

A PTC device may be installed on the protective circuit board to form a protective circuit module. The PTC device may prevent the flow of electric current upon the occurrence of elevated temperature in the protective circuit board, thus ensuring safety of the battery. This PTC device may be a chip-type PTC device. The chip-type PTC device may have advantages, e.g., ease of installation, low cost, and the like.

The chip-type PTC device may be installed on the protective circuit board, spaced apart from the bare cell. As a result, the temperature-detecting performance of the chip-type PTC device may deteriorate when the temperature of the bare cell is elevated. That is, the chip-type PTC device may fail to directly detect heat generated from the bare cell and therefore may not reliably perform its protective functions.

SUMMARY

Embodiments are therefore directed to a protective circuit module and a rechargeable battery including the same which substantially overcome one or more of the problems due to the limitations and disadvantages of the related art.

It is therefore a feature of an embodiment to provide a protective circuit module having improved temperature-detecting performance.

At least one of the above and other features and advantages may be realized by providing a protective circuit module including a circuit board main body having an electrode terminal tab configured to electrically connect to an electrode terminal of a bare cell, a chip-type PTC device on the circuit board main body, and a heat transfer member connected to the chip-type PTC device and to the electrode terminal tab.

The electrode terminal tab may be a negative terminal tab and may be electrically connected to a negative terminal of the bare cell.

The electrode terminal tab may include a terminal-fixing part configured to connect to the electrode terminal of the bare cell and a circuit board-fixing part formed integrally with the terminal-fixing part and fixed to the circuit board main body.

The terminal-fixing part may be bent away from the circuit board-fixing part and may be configured to be substantially parallel to the electrode terminal of the bare cell.

The terminal-fixing part may be bent concavely away from the circuit board-fixing part and may be configured to contact the electrode terminal of the bare cell.

The heat transfer member may extend between the chip-type PTC device and the electrode terminal tab.

The heat transfer member may include a bending portion and a contact portion extending from the bending portion to the chip-type PTC device.

The bending portion may be connected to the electrode terminal tab.

The heat transfer member and the electrode terminal tab may be integrally formed.

The protective circuit module may further include an adhesive member connecting the heat transfer member to the chip-type PTC.

The adhesive member may be an insulating tape.

The chip-type PTC device may include a PTC body including upper and lower surfaces, a conductive polymer having PTC properties, a first conductive portion and a second conductive portion, the first conductive portion and the second conductive portion including metal foil on the upper and lower surfaces of the PTC body.

The circuit board main body may include a lower surface, the heat transfer member may be on the lower surface, and the heat transfer member may include a heat transfer path connecting the electrode terminal tab and the chip-type PTC device.

The heat transfer path may include a pattern electrically connecting the electrode terminal tab and the chip-type PTC device and a solder cream on an upper part of the pattern.

The electrode terminal tab may be a positive terminal tab in electrical connection with a positive terminal of the bare cell.

At least one of the above and other features and advantages may also be realized by providing a rechargeable battery including a bare cell, and a protective circuit module electrically connected to the bare cell, wherein the protective circuit module includes a circuit board main body, a chip-type PTC device on the circuit board main body, an electrode terminal tab electrically connected to the bare cell and a heat transfer member electrically connecting the chip-type PTC device and the electrode terminal tab.

The bare cell may include a negative terminal and the heat transfer member may be connected to the negative terminal by the electrode terminal tab.

The bare cell may include a positive terminal and the heat transfer member may be connected to the positive terminal by the electrode terminal tab.

The positive terminal may be a cap plate of the bare cell.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION OF THE INVENTION

Korean Patent Application No. 10-2008-0103639 filed on Oct. 22, 2008 in the Korean Intellectual Property Office, and entitled "Protective Circuit Module and Rechargeable Battery Including Protective Circuit Module", is incorporated herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1A:
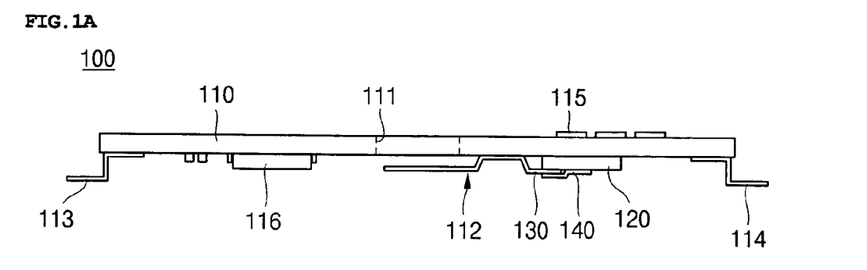
FIG. 1A illustrates a side view of a protective circuit module in accordance with an embodiment.
Figure 1B:
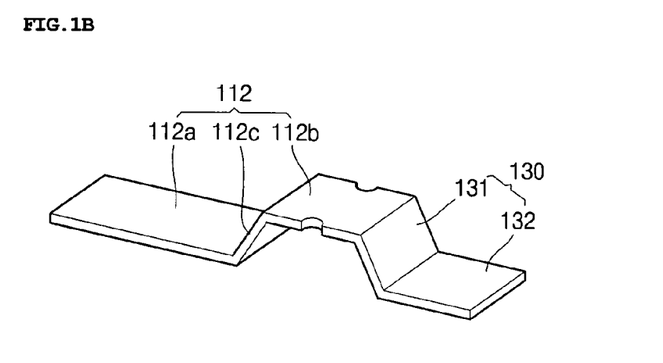
FIG. 1B illustrates a perspective view of a negative terminal tab in the protective circuit module of FIG. 1A.
Figure 1C:
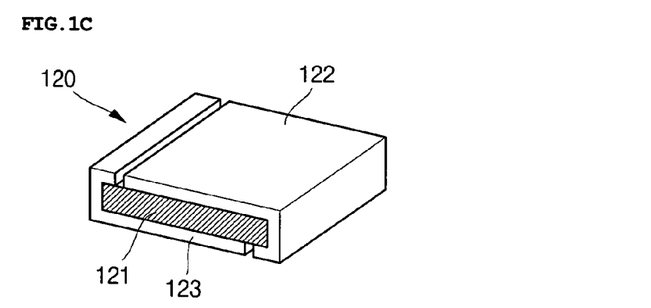
FIG. 1C illustrates a perspective view of a chip-type PTC device in the protective circuit module of FIG. 1A.

Hereinafter, preferred embodiments as described above will be described in more detail with reference to the accompanying drawings. First, a protection circuit module in accordance with an embodiment will be illustrated as follows. FIG. 1A illustrates a side view of a protective circuit module in accordance with an embodiment. FIG. 1B illustrates a perspective view of a negative terminal tab in the protective circuit module of FIG. 1A. FIG. 1C illustrates a perspective view of a chip-type PTC device in the protective circuit module of FIG. 1A.

Referring to FIGS. 1A through 1C, a protective circuit module 100 in accordance with an embodiment may include a circuit board main body 110, a chip-type positive temperature coefficient (PTC) device 120 on the circuit board main body 110 and a heat transfer member 130 between the chip-type PTC device 120 and a heat-generating part of a bare cell (not shown). Further, the main protective circuit module 100 may include a negative terminal tab 112 connected to a negative terminal (not shown), which may also be a heat-generating part of the bare cell.

The circuit board main body 110 may include a hole 111 generally at the center thereof. The negative terminal tab 112 may be attached to a lower part of the hole 111 of the circuit board main body 110. The negative terminal tab 112 may be electrically connected to the negative terminal of the bare cell. Positive terminal tabs 113 and 114 may be attached to lower surfaces of right and left ends of the circuit board main body 110. At least one of the positive terminal tabs 113 and 114 may be electrically connected to the positive terminal of the bare cell. An upper surface of the circuit board main body 110 may include several external terminals 115 for transfer of electric current from the battery to the outside. In addition, a lower surface of the circuit board main body 110 may include several protective circuit devices 116.

The negative terminal tab 112 may include a terminal-fixing part 112a electrically connected to the negative terminal of the bare cell and a circuit board-fixing part 112b formed integrally with the terminal-fixing part 112a. The circuit board-fixing part 112b may be fixed to the circuit board main body 110. The terminal-fixing part 112a may have a rectangular plate-shape. This plate-shaped terminal-fixing part 112a may be substantially parallel to the negative terminal of the bare cell. When it is welded to the negative terminal of the bare cell, the terminal-fixing part 112a may be flexibly welded. Therefore, the terminal-fixing part 112a may be elastically welded to the negative terminal of the bare cell. This configuration may advantageously support a connection between the terminal-fixing part 112a and the negative terminal, even when the circuit board main body 110 is bent. The circuit board-fixing part 112b may be bent away from an end of the terminal-fixing part 112a and may have a rectangular plate-shape to make close contact with a lower surface of the circuit board main body 110. The terminal-fixing part 112a and the circuit board-fixing part 112b may be integrally connected to each other by a connecting portion 112c.

The negative terminal tab 112 may be formed integrally with the heat transfer member 130. The heat transfer member 130 may extend from an end of a circuit board-fixing part 112b of the negative terminal tab 112 to contact the chip-type PTC device 120. The heat transfer member 130 may include an electrically and thermally conductive material.

The heat transfer member 130 may include a bending portion 131 fixed to a lower surface of the circuit board main body 110 and bent away from the circuit board-fixing part 112b. The heat transfer member 130 may also include a contact portion 132 extending from the bending portion 131 to contact an outer surface of the chip-type PTC device 120.

The bending portion 131 of the heat transfer member 130 may be vertical or may be oblique at a predetermined angle of inclination. That is, the bending portion 131 may have a height that ensures that the contact portion 132 may contact a surface of the chip-type PTC device 120. The contact portion 132 may have a length and area sufficient to ensure contact with a surface of the chip-type PTC device 120.

Further, the heat transfer member 130 and the chip-type PTC device 120 may be attached to each other by an adhesive member 140. That is, the adhesive member 140 may connect the two members such that the contact portion 132 of the heat transfer member 130 is in contact with a surface of the chip-type PTC device 120. The adhesive member 140 is preferably a tape, and more preferably an insulating tape. However, there is no particular limit to the kinds of the adhesive member 140 that may be used.

The chip-type PTC device 120 may include a PTC body 121 including a conductive polymer having PTC properties and first and second conductive portions 122 and 123 in the form of, e.g., metal foil, on upper and lower surfaces of the PTC body 121. The PTC body 121 may be prepared by dispersing conductive particles in crystalline polymers. When the battery is below a given temperature, the PTC body 121 may serve as a current-flow path between the first conductive portion 122 and the second conductive portion 123. When the battery is exposed to a high temperature above a predetermined temperature due to, e.g., overcurrent, the crystalline polymers may swell, leading to dissociation of the conductive particles dispersed in the crystalline polymers, which may bring about a rapid increase in resistance. As a result, electric current flow between the first conductive portion 122 and the second conductive portion 123 may be blocked or decreased. This may cut off the current flow from the bare cell to the external terminals 115. The PTC body 121 may serve a safety device for preventing, e.g., rupture of the battery. When the battery is then cooled below the predetermined temperature, the crystalline polymers of the PTC body 121 may shrink, which may lead to re-association of the conductive particles, reestablishing a smooth flow of electric current.

Hereinafter, operation of the protective circuit module 100 in accordance with an embodiment as constructed above will be described. A circuit board main body 110 of the protective circuit module 100 may be electrically connected to the bare cell by the PTC device 120, the heat transfer member 130 and the negative terminal tab 112 to the region of the hole 111. This may be accomplished by e.g., welding the same to a negative terminal of the bare cell.

Accordingly, electric current from the negative terminal of the bare cell may flow to the external terminals 115 on the circuit board main body 110 through the negative terminal tab 112, the heat transfer member 130 and the chip-type PTC device 120. The chip-type PTC device 120 may receive electric current and heat through a heat transfer member 130, which may be formed integrally with the circuit board-fixing part 112b of the negative terminal tab 112.

The chip-type PTC device 120 may directly detect heat from the negative terminal of the bare cell through the heat transfer member 130 formed integrally with the negative terminal tab 112. As a result, heat-detecting properties of the chip-type PTC device 120 may be significantly improved. Accordingly, overcurrent, which may produce heat, may result in a rapid increase of internal resistance in the PTC body 121 of the chip-type PTC device 120, so the flow of electric current between the first conductive portion 122 and the second conductive portion 123 may be prevented. The disconnection between the bare cell and the external terminals 115 cuts off heat generating charging/discharging operations of the battery. In this manner, rupture or ignition of the battery may be prevented by the chip-type PTC device 120.

Figure 2A:
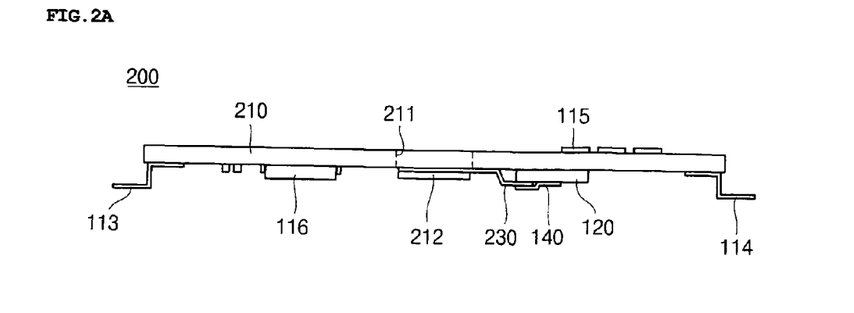
FIG. 2A illustrates a side view of a protective circuit module in accordance with another embodiment.
Figure 2B:
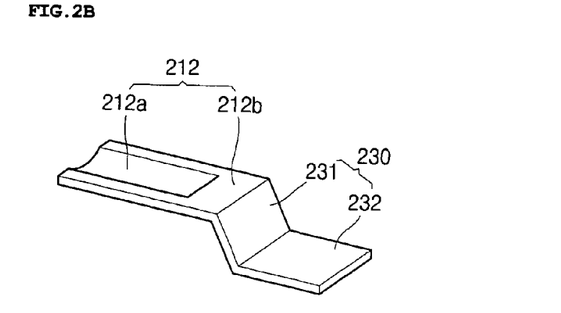
FIG. 2B illustrates a perspective view of a negative terminal tab in the protective circuit module of FIG. 2A.
Figure 2C:
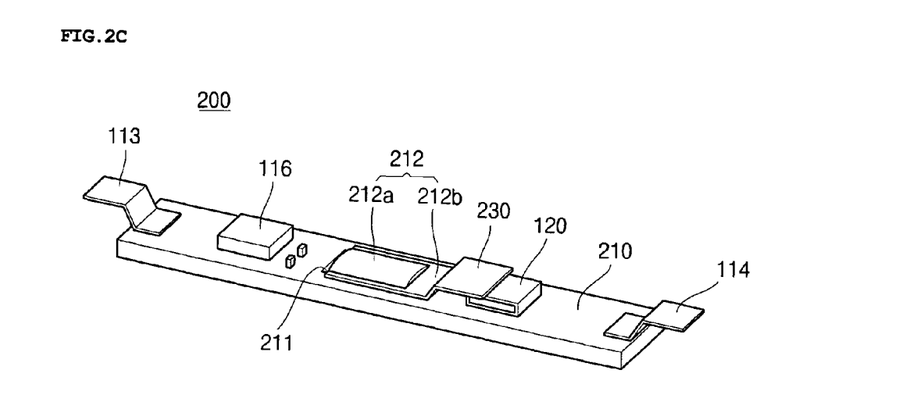
FIG. 2C illustrates a perspective view of a protective circuit module of FIG. 2A in a reversed state.

Hereinafter, a protective circuit module 200 in accordance with another embodiment will be described. FIG. 2A illustrates a side view of a protective circuit module in accordance with another embodiment. FIG. 2B illustrates a perspective view of a negative terminal tab in the protective circuit module of FIG. 2A. FIG. 2C illustrates a perspective view of a protective circuit module of FIG. 2A in a reversed state.

Referring to FIGS. 2A to 2C, a protective circuit module 200 in accordance with another embodiment may include a circuit board main body 210, a chip-type PTC device 120 on the circuit board main body 210 and a heat transfer member 230 between the chip-type PTC device 120 and a heat-generating part of a bare cell (not shown). Further, the protective circuit module 200 may include a negative terminal tab 212 connected to a negative terminal (not shown), which may also be a heat-generating part of the bare cell.

The circuit board main body 210 may have a hole 211 generally at the center thereof. The negative terminal tab 212 may be attached to a lower part of the hole 211. Positive terminal tabs 113 and 114 on lower surfaces of right and left ends of the circuit board main body 210, external terminals 115 on an upper surface of the circuit board main body 210 and a protective circuit device 116 on a lower surface of the circuit board main body 210 may have the same configuration the previous embodiment.

The negative terminal tab 212 may be formed integrally with the heat transfer member 230. The negative terminal tab 212 and the heat transfer member 230 may include a thermally and electrically conductive material. The integrally formed negative terminal tab 212 and heat transfer member 230 may electrically and thermally connect the bare cell with the chip-type PTC device 120. The negative terminal tab 212 may include a terminal-fixing part 212a connected to a negative terminal of the bare cell and a circuit board-fixing part 212b formed integrally with the terminal-fixing part 212a and fixed to the circuit board main body 210. The circuit board-fixing part 212b may have a rectangular plate-shape. The terminal-fixing part 212a may be bent concavely downward to have a U-shaped cross section such that it may be in contact with the negative terminal of the bare cell near the inside center of the circuit board-fixing part 212b.

The heat transfer member 230 may extend from an end of a circuit board-fixing part 212b of the negative terminal tab 212 to contact the chip-type PTC device 120. The heat transfer member 230 may include a bending portion 231 fixed to a lower surface of the circuit board main body 210 and bent away from the circuit board-fixing part 212b. The heat transfer member 230 may also include a contact portion 232 extending from the bending portion 231 to contact an outer surface of the chip-type PTC device 120.

The bending portion 231 of the heat transfer member 230 may be vertical or may be oblique at a predetermined angle of inclination. That is, the bending portion 231 may have a height that ensures that the contact portion 232 may contact a surface of the chip-type PTC device 120. The contact portion 232 may have a length and area sufficient to ensure contact with a surface of the chip-type PTC device 120. Further, the heat transfer member 230 and the chip-type PTC device 120 may be attached to each other by the adhesive member 140. The chip-type PTC device 120 may have the same configuration as that of the previous embodiment, so repeated description thereof will be omitted.

Hereinafter, operation of the protective circuit module 200 in accordance with another embodiment as constructed above will be described. The protective circuit module 200 may be electrically connected to the bare cell such that the terminal-fixing part 212a of the negative terminal tab 212 may be welded to a negative terminal (not shown) of the bare cell. The terminal-fixing part 212a may have a generally U-shaped cross section and may bend concavely downward toward the negative terminal of the bare cell. As a result, the negative terminal of the bare cell may be stably supported by the terminal-fixing part 212a.

Accordingly, electric current from the negative terminal of the bare cell may be transferred to the external terminals 115 on the circuit board main body 210 through the negative terminal tab 212, the heat transfer member 230 and the chip-type PTC device 120. The chip-type PTC device 120 may receive electric current and heat through the thermally and electrically conductive heat transfer member 230, which may be formed integrally with the negative terminal tab 212.

As such, the chip-type PTC device 120 may directly detect heat from the negative terminal of the bare cell through the heat transfer member 230. Accordingly, overcurrent, which may produce heat in the bare cell, may cause the internal resistance of the chip-type PTC device 120 to rapidly increase, thereby blocking the current flow between the bare cell and the external terminals 115, preventing, e.g., battery rupture or ignition. The disconnection between the bare cell and the external terminals 115 cuts off the heat generating charging/discharging operations of the battery.

Figure 3:
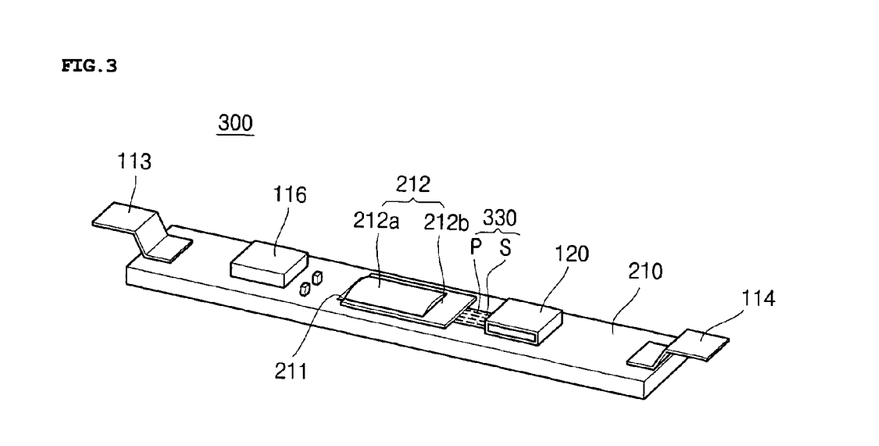
FIG. 3 illustrates a perspective view of a protective circuit module in accordance with yet another embodiment.

Hereinafter, a protective circuit module 300 in accordance with yet another embodiment will be described. FIG. 3 illustrates a perspective view of a protective circuit module in accordance the embodiment in a reversed state. Referring to FIG. 3, a protective circuit module 300 in accordance with the present embodiment may include a circuit board main body 210, a chip-type PTC device 120 on the circuit board main body 210 and a heat transfer member 330 between the chip-type PTC device 120 and a heat-generating part of a bare cell (not shown).

The circuit board main body 210 and PTC device 120 may have the same configuration as that of the previous embodiment. Like numbers refer to like elements throughout the specification and drawings, so repeated description thereof will be omitted.

According to the present embodiment, the heat transfer member 330 may provide an electrical and thermal connection between the negative terminal tab 212 and the chip-type PTC device 120 on a lower surface of the circuit board main body 210. Therefore, the negative terminal tab 212 may be connected to a negative terminal (not shown) of the bare cell, so the chip-type PTC device 120 and the negative terminal of the bare cell may be connected to each other by the heat transfer member 330. The heat transfer member 330 and the external terminals 115 may be electrically connected by the chip-type PTC device 120.

The heat transfer member 330 may include a heat transfer path. The heat transfer path may include a pattern (P) for electrically connecting the negative terminal tab 212 and the chip-type PTC device 120. A thermally conductive solder cream (S) may then be applied to an upper part of the pattern (P). The pattern (P) may function as a current flow path; and the solder cream (S) may serve as a heat transfer path, so heat-detecting performance of the chip-type PTC device 120 may be significantly improved. A wire solder or the like may be used for the heat transfer member 330. The heat transfer member 330 may extend from an end of the circuit board-fixing part 212b of the negative terminal tab 212 to the chip-type PTC device 120.

Hereinafter, operation of the protective circuit module 300 in accordance with the present embodiment will be described. The external terminals 115 of the protective circuit module 300 may be electrically connected to the bare cell by a terminal-fixing part 212a of the negative terminal tab 212 welded to a negative terminal (not shown) of the bare cell. Accordingly, electric current and heat from the negative terminal of the bare cell may flow through the negative terminal tab 212 to the chip-type PTC device 120 by a heat transfer member 330 electrically and thermally connected to the negative terminal tab 212.

Therefore, the chip-type PTC device 120 may directly detect heat from the negative terminal of the bare cell through the heat transfer member 330. Accordingly, overcurrent, which may produce heat in the battery, cuts off the current flow between the bare cell and the external terminals 115 to prevent, e.g., battery rupture or ignition.

Figure 4:
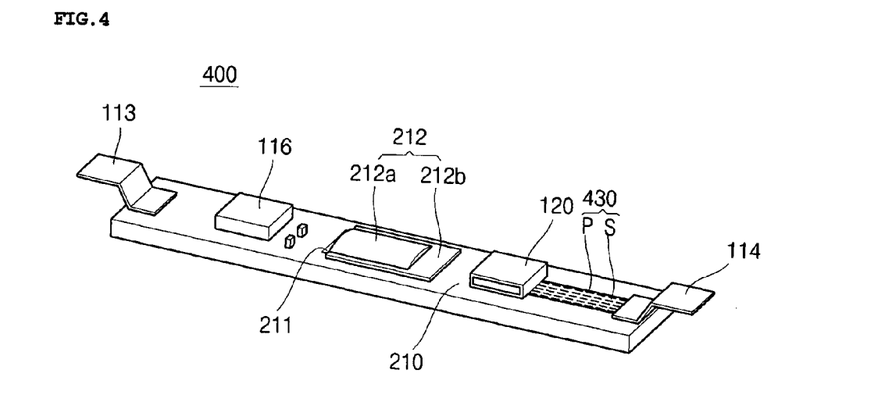
FIG. 4 illustrates a perspective view of a protective circuit module in accordance with still another embodiment.

Hereinafter, a protective circuit module 400 in accordance with still another embodiment is described. FIG. 4 illustrates a perspective view of a protective circuit module in accordance with still another embodiment in a reversed state. Referring to FIG. 4, the protective circuit module 400 in accordance with the present embodiment may include a circuit board main body 210, a chip-type PTC device 120 on the circuit board main body 210, and a thermally and electrically conductive heat transfer member 430 between the chip-type PTC device 120 and a heat-generating part of a bare cell (not shown).

The circuit board main body 210 and the chip-type PTC device 120 may have the same configuration as that of the previous embodiment. Like numbers refer to like elements throughout the specification and drawings, so repeated description thereof will be omitted.

In the protective circuit module 400 in accordance with the present embodiment, at least one of the positive terminal tabs 113 and 114 on lower surfaces of right and left ends of the circuit board main body 210 may be electrically and thermally connected to the chip-type PTC device 120 on a lower surface of the circuit board main body 210 by the heat transfer member 430.

The positive terminal tabs 113 and 114 may be connected to a cap plate (not shown) which may function as a positive terminal of the bare cell. Therefore, the chip-type PTC device 120 may be electrically and thermally connected to a positive terminal that corresponds to a heat-generating part of the bare cell via the heat transfer member 430.

At least one of the positive terminal tabs 113 and 114 may be electrically and thermally connected to the chip-type PTC device 120 by the heat transfer member 430. Although the chip-type PTC device 120 and the positive terminal tab 114 are connected in FIG. 4, the other positive terminal tab 113 may also be connected to the chip-type PTC device 120.

The heat transfer member 430 may include a heat transfer path. The heat transfer path may include a pattern (P) electrically connecting the positive terminal tab 114 and the chip-type PTC device 120. A thermally conductive solder cream (S) may then be applied to an upper part of the pattern (P). Through the heat transfer path 430, the pattern (P) may form a current flow path and the thermally conductive solder cream (S) may form a heat transfer path, so heat-detecting performance of the chip-type PTC device 120 may be significantly improved. A wire solder or the like may be used as the heat transfer member 430. The heat transfer member 430 may contact an end of the positive terminal tab 114 and the chip-type PTC device 120.

Hereinafter, operation of the protective circuit module 400 in accordance with the present embodiment will be described. The external terminals 115 of the protective circuit module 400 may be electrically connected to the bare cell by the negative terminal tab 212 welded to a negative terminal (not shown) of the bare cell. In addition, positive terminal tabs 113 and 114 on the lower surface of right and left ends of the circuit board main body 210 may be welded to an upper surface of a cap plate (not shown) of the bare cell and also electrically connected to the external terminals 115. The cap plate of the bare cell may correspond to a positive terminal of the bare cell, so the positive terminal tabs 113 and 114 may be electrically connected to the positive terminal of the bare cell.

Accordingly, electric current and heat from the cap plate of the bare cell may, be transferred to the heat transfer member 430 through the positive terminal tab 114 and may then be transferred to the chip-type PTC device 120 by the heat transfer member 430. The chip-type PTC device 120 may directly detect electric current and heat from the cap plate of the bare cell through the electrically and thermally conductive heat transfer member 430. Accordingly, overcurrent, which may produce heat in the battery, may rapidly increase the internal resistance of the chip-type PTC device 120, thereby blocking the current flow between the bare cell and the external terminals 115, thus preventing, e.g., battery rupture or ignition.

Figure 5:
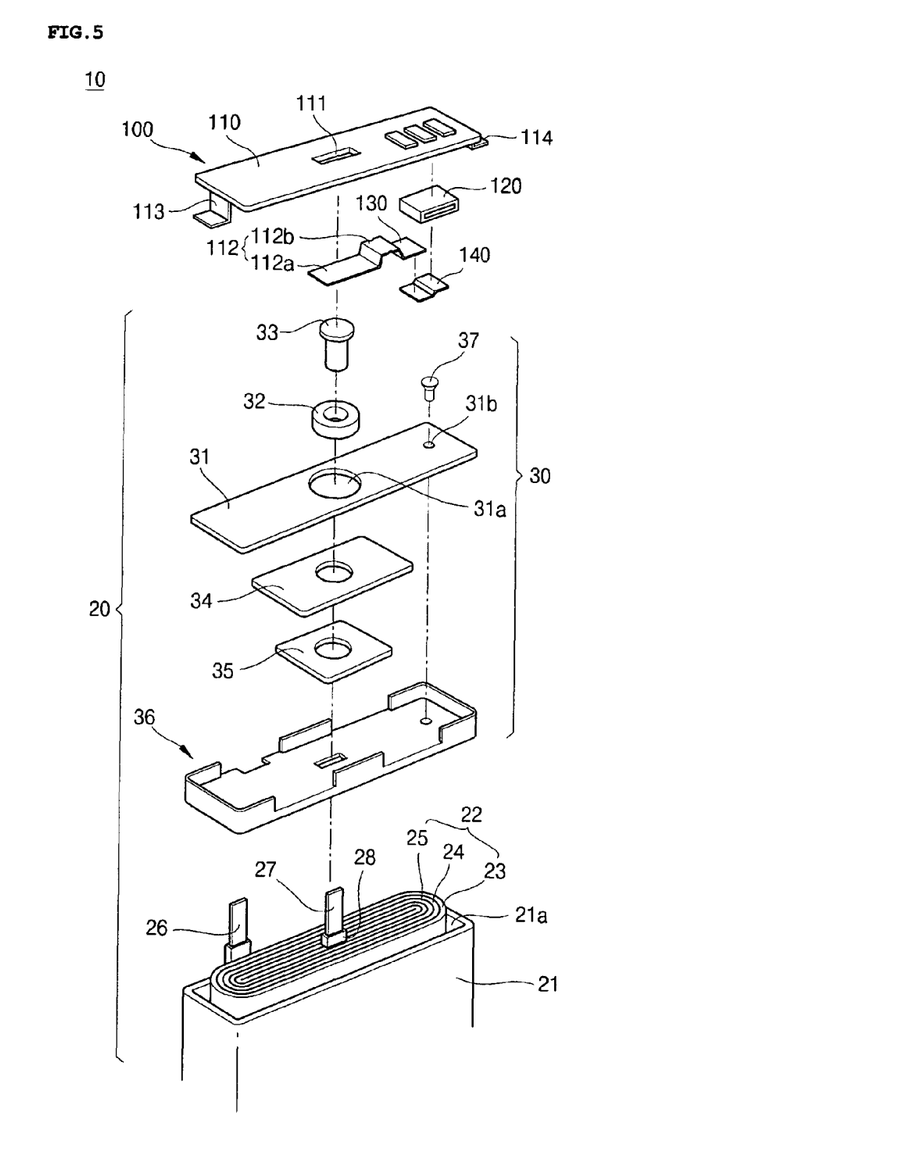
FIG. 5 illustrates an exploded perspective view of a rechargeable battery having a protective circuit module in accordance with an embodiment.

Hereinafter, a square-type rechargeable battery having protective circuit modules in accordance with various embodiments as described above will be described. FIG. 5 illustrates an exploded perspective view of a rechargeable battery having a protective circuit module in accordance an embodiment.

Referring to FIG. 5, a rechargeable battery 10 may include a bare cell 20 and a protective circuit module 100 electrically connected to the bare cell 20. The bare cell 20 may include a can 21, an electrode assembly 22 housed in the can 21 and a cap assembly 30 for sealing an open part 21a of the can 21.

In a square rechargeable battery, the can 21 may be a generally rectangular-shaped metal container which has an open part 21a at one end thereof and may be formed by a processing method, e.g., deep drawing. Therefore, the can 21 may also serve as a terminal. The can 21 is preferably formed of, e.g., an aluminum or aluminum alloy that is a light-weight conductive metal.

The electrode assembly 22 may be prepared by stacking a positive electrode plate 23, a negative electrode plate 25 and a separator 24 disposed therebetween and winding the resulting stacked structure into a jelly roll shape. The positive electrode plate 23 may be formed by coating, e.g., lithium cobalt oxide ($LiCoO_2$), as a positive electrode active material on a current collector made of, e.g., aluminum. The negative electrode plate 25 may be formed by coating, e.g., carbon, as a negative electrode active material on a current collector made of, e.g., copper. The separator 24 may be formed of, e.g., polyethylene, polypropylene or a copolymer thereof.

A positive electrode tab 26 connected to the positive electrode plate 23 and a negative electrode tab 27 connected to the negative electrode plate 25 may be drawn upward from the electrode assembly 22. In order to prevent an electrical short circuit that may possibly occur between the positive electrode plate 23 and the negative electrode plate 25, the interface region drawn outward from the electrode assembly 22 may be wound by an insulating tape 28.

The cap assembly 30 may include a cap plate 31, a gasket 32, a negative terminal 33, an insulating plate 34, a terminal plate 35, an insulating case 36 and a plug 37. The cap plate 31 may include a terminal through-hole 31a generally at the center thereof. Upon assembly of the negative terminal 33 into the cap plate 31, the gasket 32 may be positioned on the outer periphery of the negative terminal 33 and may then pass through the terminal through-hole 31a. A side of the cap plate 31 may include an electrolyte injection hole 31b. After injection of the electrolyte is complete, the electrolyte injection hole 31b may be sealed with a plug 27.

The insulating plate 34 may be disposed below the cap plate 31; and a terminal plate 35 may be disposed below the insulating plate 34. Therefore, the insulating plate 34 may provide electrical insulation between the cap plate 31 and the terminal plate 35. The terminal plate 35 may be connected to a lower end of the negative terminal 33.

The negative electrode plate 25 of the electrode assembly 22 may be electrically connected to the negative terminal 33 through the negative electrode tab 27 and the terminal plate 35. Further, the positive electrode plate 23 of the electrode assembly 22 may be electrically connected to the cap plate 31 through the positive electrode tab 26. Therefore, the cap plate 31 may serve as a positive terminal.

The insulating case 36 may be disposed on an upper part of the electrode assembly 22 to thereby prevent electrical connection between the electrode assembly 22 and the cap assembly 30.

The protective circuit module 100 may include a circuit board main body 110, a chip-type PTC device 120 on the circuit board main body 110, external terminals 115 and an electrically and thermally conductive heat transfer member 130 between the chip-type PTC device 120 and the negative terminal 33 of the bare cell 20. The circuit board main body 110, chip-type PTC device 120 and heat transfer member 130 may have the same configuration as that of the protective circuit module 100 described above, so repeated description thereof will be omitted.

Hereinafter, operation of a rechargeable battery 10 in accordance with the present embodiment will be described. The external terminals 115 of the protective circuit module 100 may be electrically connected to the bare cell by the PTC device 120, the heat transfer member 130, and the negative terminal tab 112. This may be accomplished by, e.g., laser-welding thereof, to a negative terminal 33 of the bare cell 20. In addition, positive terminal tabs 113 and 114 may be electrically connected to right and left sides of an upper surface of the cap plate 31 of the bare cell 20 by, e.g., a resistance welding method. Therefore, the cap plate 31 may serve as a positive terminal.

Electric current from the negative terminal 33 of the bare cell may flow to the external terminals 115 of the circuit board main body 110 through the negative terminal tab 112, the heat transfer member 130 formed integrally with the negative terminal tab 112 and the chip-type PTC device 120. That is, the chip-type PTC device 120 may directly receive heat and electric current from the bare cell through the electrically and thermally conductive heat transfer member 130.

As discussed above, when the bare cell 20 is below the predetermined temperature under a condition where the chip-type PTC device 120 and the negative terminal 33 of the bare cell are electrically connected to each other, an electric current flow may normally take place between the bare cell 20 and the external terminals 115 through the chip-type PTC device 120. On the other hand, when the bare cell 20 experiences overcurrent, heat produced by the overcurrent may cause the crystalline polymers of the chip-type PTC device 120 to swell and disaggregate the conductive particles dispersed in the crystalline polymers. Therefore, the chip-type PTC device 120 may block the flow of electric current, cutting off heat generating charging/discharging operations, thereby serving as a safety device that may prevent, e.g., rupture of the battery. When the battery returns to a normal temperature, the conductive particles of the chip-type PTC device 120 may recombine, thus reestablishing a normal flow of electric current.

As apparent from the above description, the embodiments enable improved battery safety. For this purpose, an electrically and thermally conductive heat transfer member may be provided between the chip-type PTC device and the bare cell, such that the chip-type PTC device may directly detect temperature changes in the bare cell.

This heat transfer path may be provided by being integrally formed with a negative terminal tab or positive terminal tab typically installed in the protective circuit module, or by applying a solder cream or wire solder material to a circuit board main body of the protective circuit module. Such approaches may enable reduction of production costs and simplification of production processes.

Exemplary embodiments have been disclosed herein; and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A protective circuit module, comprising:
a circuit board main body having an electrode terminal tab configured to electrically connect to an electrode terminal of a bare cell;
a chip-type PTC device on the circuit board main body; and
a heat transfer member connected to the chip-type PTC device and to the electrode terminal tab, the chip-type PTC device being adhered directly between an end of the heat transfer member and a side of the circuit board main body, and the heat transfer member and the electrode terminal tab being integrally formed,
wherein the electrode terminal tab includes a terminal-fixing part configured to connect to the electrode terminal of the bare cell and a circuit board-fixing part formed integrally with the terminal-fixing part and fixed to the circuit board main body,
wherein the heat transfer member includes a bending portion and a contact portion extending from the bending portion to the chip-type PTC device, and wherein the circuit-board fixing part of the electrode terminal tab contacts a bottom surface of the circuit board main body.

2. The protective circuit module as claimed in claim 1, wherein the electrode terminal tab is a negative terminal tab and is electrically connected to a negative terminal of the bare cell.

3. The protective circuit module as claimed in claim 1, wherein the terminal-fixing part is bent away from the circuit board-fixing part and is configured to be substantially parallel to the electrode terminal of the bare cell.

4. The protective circuit module as claimed in claim 1, wherein the terminal-fixing part is bent concavely away from the circuit board-fixing part and is configured so as to contact the electrode terminal of the bare cell.

5. The protective circuit module as claimed in claim 1, wherein the heat transfer member extends between the chip-type PTC device and the electrode terminal tab.

6. The protective circuit module as claimed in claim 1, wherein the bending portion is connected to the electrode terminal tab.

7. The protective circuit module as claimed in claim 1, further comprising an adhesive member connecting the heat transfer member to the chip-type PTC.

8. The protective circuit module as claimed in claim 7, wherein the adhesive member is an insulating tape.

9. The protective circuit module as claimed in claim 1, wherein:
the chip-type PTC device includes a PTC body including upper and lower surfaces, a conductive polymer having PTC properties, a first conductive portion and a second conductive portion, the first conductive portion and the second conductive portion including metal foil enclosing the upper and lower surfaces of the PTC body, and
the PTC body is between the end of the heat transfer member and the side of the circuit board main body.

10. The protective circuit module as claimed in claim 1, wherein the side of the circuit board main body having the chip-type PTC device adhered directly thereto is a lower surface of the circuit board main body that faces the bare cell, the heat transfer member is on the lower surface, and the heat transfer member includes a heat transfer path connecting the electrode terminal tab and the chip-type PTC device.

11. The protective circuit module as claimed in claim 10, wherein the heat transfer path includes a pattern electrically connecting the electrode terminal tab and the chip-type PTC device and a solder cream on an upper part of the pattern.

12. The protective circuit module as claimed in claim 1, wherein the electrode terminal tab is a positive terminal tab in electrical connection with a positive terminal of the bare cell.

13. A rechargeable battery, comprising:
a bare cell; and
a protective circuit module electrically connected to the bare cell, wherein:
the protective circuit module includes a circuit board main body, a chip-type PTC device on the circuit board main body, an electrode terminal tab electrically connected to the bare cell, and a heat transfer member electrically connecting the chip-type PTC device and the electrode terminal tab,
the chip-type PTC device is adhered directly between an end of the heat transfer member and a side of the circuit board main body, and the heat transfer member and the electrode terminal tab being integrally formed,
wherein the electrode terminal tab includes a terminal-fixing part configured to connect to the electrode terminal of the bare cell and a circuit board-fixing part formed integrally with the terminal-fixing part and fixed to the circuit board main body,
wherein the heat transfer member includes a bending portion and a contact portion extending from the bending portion to the chip-type PTC device, and
wherein the circuit-board fixing part of the electrode terminal tab contacts a bottom surface of the circuit board main body.

14. The rechargeable battery as claimed in claim 13, wherein the bare cell includes a negative terminal and the heat transfer member is connected to the negative terminal by the electrode terminal tab.

15. The rechargeable battery as claimed in claim 13, wherein the bare cell includes a positive terminal and the heat transfer member is connected to the positive terminal by the electrode terminal tab.

16. The rechargeable battery as claimed in claim 15, wherein the positive terminal is a cap plate of the bare cell.

17. The protective circuit module as claimed in claim 1, wherein the chip-type PTC device is adhered directly between an upper side of the end of the heat transfer member, and the side of the circuit board main body having the chip-type PTC device adhered thereto is a lower surface of the circuit board main body.

* * * * *